United States Patent [19]
Poupitch

[11] 3,831,741
[45] Aug. 27, 1974

[54] EXTRUDED PLASTIC CONTAINER CARRIER STOCK AND METHODS FOR PRODUCING THE SAME

[75] Inventor: Ougljesa Jules Poupitch, La Jolla, Calif.

[73] Assignee: Illinois Tool Works, Inc., Chicago, Ill.

[22] Filed: May 5, 1972

[21] Appl. No.: 250,535

[52] U.S. Cl............... 206/150, 156/167, 264/167, 294/87.2
[51] Int. Cl... B65d 71/00, B66f 19/00, D01d 11/00
[58] Field of Search.................. 206/65 C; 294/87.2; 224/45 AA, 45 W

[56] References Cited
UNITED STATES PATENTS

| | | | |
|---|---|---|---|
| 2,905,502 | 9/1959 | Brown | 224/45 W |
| 2,919,467 | 1/1960 | Mercer | 264/167 |
| 3,242,023 | 3/1966 | Schultheiss | 161/DIG. 6 |
| 3,258,288 | 6/1966 | Courter | 294/87.2 |
| 3,385,626 | 5/1968 | Wozniak | 294/87.2 |
| 3,480,135 | 11/1969 | Rockett | 206/65 C |
| 3,551,543 | 12/1970 | Mercer et al. | 264/167 |
| 3,611,656 | 10/1971 | Chidsey, Jr. | 206/65 C X |

*Primary Examiner*—Leonard Summer

[57] ABSTRACT

Multiple container carrier stock comprising strands of a resilient and deformable plastic material that has been extruded and fused in the molten or semi-molten state to form integral stretchable bands. The fusion joints have smooth curvilinear surfaces void of sharp corners. Similarly formed strands provide a handle and outer side rails. The carrier is applied to a plurality of cylindrical containers to form a package.

4 Claims, 6 Drawing Figures

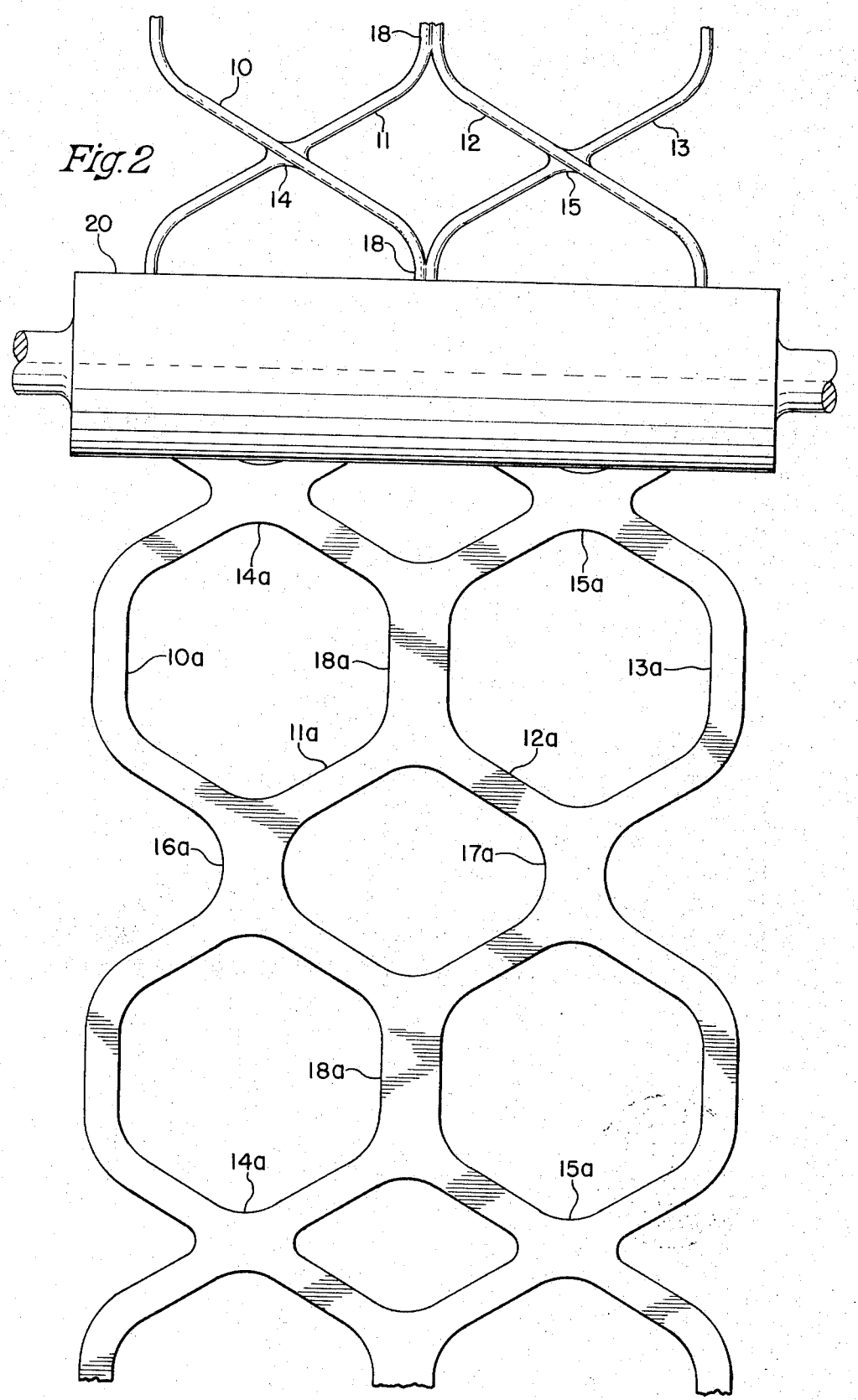

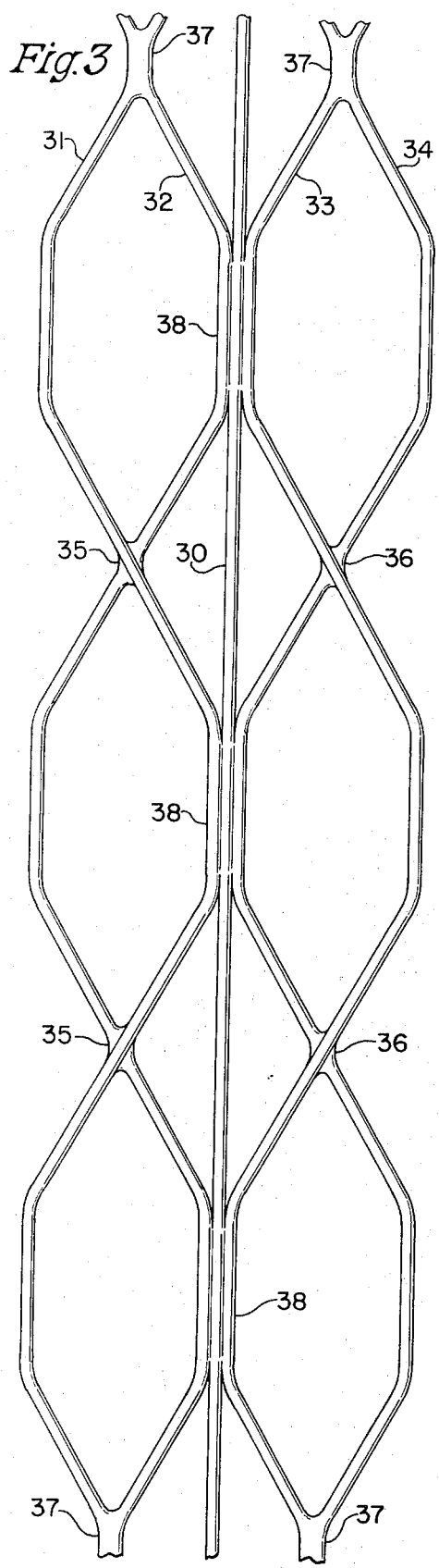
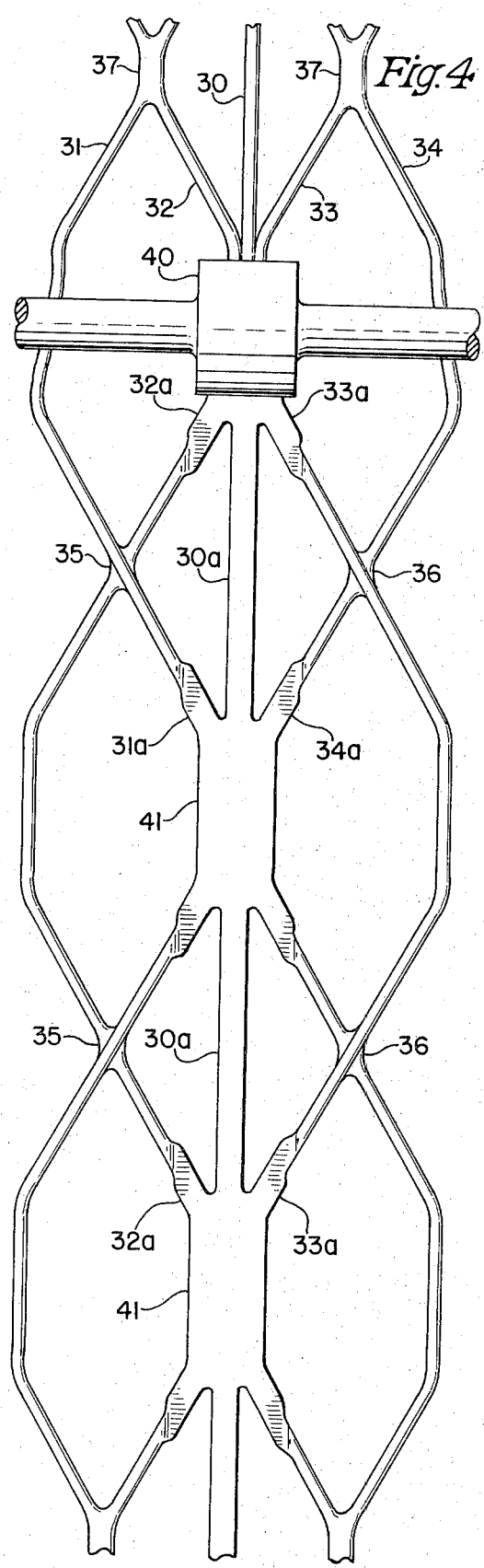

EXTRUDED PLASTIC CONTAINER CARRIER STOCK AND METHODS FOR PRODUCING THE SAME

BACKGROUND OF THE INVENTION

The invention can be made with known apparatus for extruding a molten plastic material such as polyethylene from what may be described as a plurality of nozzles, and by then moving the nozzles or extruded strands while the plastic material is still in a molten or semi-molten state in reciprocating patterns along lines perpendicular to the direction of extrusion to cause the strands to intersect and be fused at selected positions linearly of the strands as they are extruded. The former carrier stock is then cooled and thereafter may be cut into individual carriers. Suitable apparatus has previously been used to produce plastic netting as shown in the U.S. Pat. to Mercer, No. 2,919,467, and as will appear hereinafter, the present invention contemplates the use of such apparatus and variations thereof to produce the multiple container carrier stock of the invention.

Prior art multiple container carriers have been made from plastic materials and particularly sheet material as shown for example in the Poupitch U.S. Pat. No. 2,874,835. Further, cord-like container carriers have been previously known as shown in the Poupitch U.S. Pat. No. 3,097,740 and the Rockett U.S. Pat. No. 3,480,135.

SUMMARY OF THE INVENTION

The present invention is not concerned merely with the extrusion of a plastic material to form container carriers but is primarily directed to multiple container carrier stock constructions which are easy to make and which after severing into individual carriers will operate in cooperation with a plurality of cans or bottles to hold the cans or bottles together as a unitary package for storage, handling and transporting in a more positive and efficient way than heretofore known in the art. The present invention further contemplates multiple container carriers having substantially less material than container carriers of comparable strength which are made from a sheet material.

In each of the embodiments of the invention, the plastic strands are extruded to have substantially the same cross sectional width and thickness.

The invention further contemplates carrier embodiments of a substantially flattened configuration which are formed by passing the extruded carriers immediately after fusion between rollers. If necessary, the rollers may be heated.

In a number of embodiments of the invention additional strands are extruded with or without movement of the extruding nozzles and fused to the container encircling bands to provide integral handle means for carrying a package of containers which are held together by the carrier. Such handle means may be of a different thickness than that of the container encircling bands.

The individual container encircling bands are integrally connected together with any number of other such bands to define a container carrier stock. Generally, the extruded strands are severed between transversely arranged container encircling bands after the carrier stock has been applied to a selected number of containers to form a unitary package of any selected number of containers. A common number of containers for such a unitary package, especially in the beverage industry, is a 6-pack.

The primary object of the invention is to provide efficient and economical multiple container constructions and arrangements utilizing known extrusion apparatus capable of extruding and fusing a plurality of molten or semi-molten plastic strands.

Other objects and features of the invention will be apparent upon a perusal of the hereinafter following specification and drawings.

BRIEF DESCRIPTION OF THE DRAWINGS

FIG. 2 is a top plan view of the extruded container carrier stock of FIG. 1 as reformed in passing between a pair of rollers;

FIG. 3 is a top plan view of another embodiment of the invention;

FIG. 4 is a top plan view of the carrier stock of FIG. 3 and showing the resultant configuration of the carrier stock upon a portion of the stock being passed between a pair of rollers;

DETAILED DESCRIPTION OF THE PREFERRED EMBODIMENTS

In all of the embodiments of the invention, the strands as extruded from the extrusion nozzles are relatively uniform in cross sectional width and thickness. That cross sectional shape may be round, square or may even have a compound shape such as D-shaped.

The preferred material of the invention is any suitable plastic material that can be extruded as strands which will in the molten or semi-molten state fuse when the strands are brought together or caused to intersect. The preferred plastic material is further selected as one which is sufficiently resilient and deformable at normal ambient temperatures to form suitable carrier devices. One such material presently commercially available is low density polyethylene. Other plastic materials which may be used are listed in the Schultheiss U.S. Pat. No. 3,242,023.

In reductions to practice of the subject invention it has been found that the ines and planes of fusion between the strands of the carrier result in a carrier construction having unexpected and important advantages over previously known carriers which have been punched or slit from sheet material. One unexpected result is that the fusion process produces joints between strands wherein the plastic material bridges the joint in smooth curvilinear surfaces and avoids sharp corners or notches. That unexpected result is important when one considers the stretching of the container encircling bands in applying those bands about the containers intended for association with the carrier. As is well known, most plastic materials have what is generally called low notch resistance. In other words, most plastic materials when cut or punched to produce a product will have a tendency to notch, and when stretched, will be relatively weak at such notches and consequently increase the likelihood of tears or separation of the material at the notches. However, the extruded carriers of the subject invention by having fused joints, uniquely and unexpectedly produce strong and economical carriers in relatively small cross sectional dimensions. The lack of notches is further found in the embodiments of the subject invention where the extruded carrier stock is passed between heated rollers to flatten the carrier stock to resemble carriers cut or punched from sheet material.

Another advantage of the extruded and fused carriers of the subject invention is that different portions may be extruded in different thicknesses to make the most efficient use of the material for the intended functions of the carrier with a minimum of material.

Figure 1:
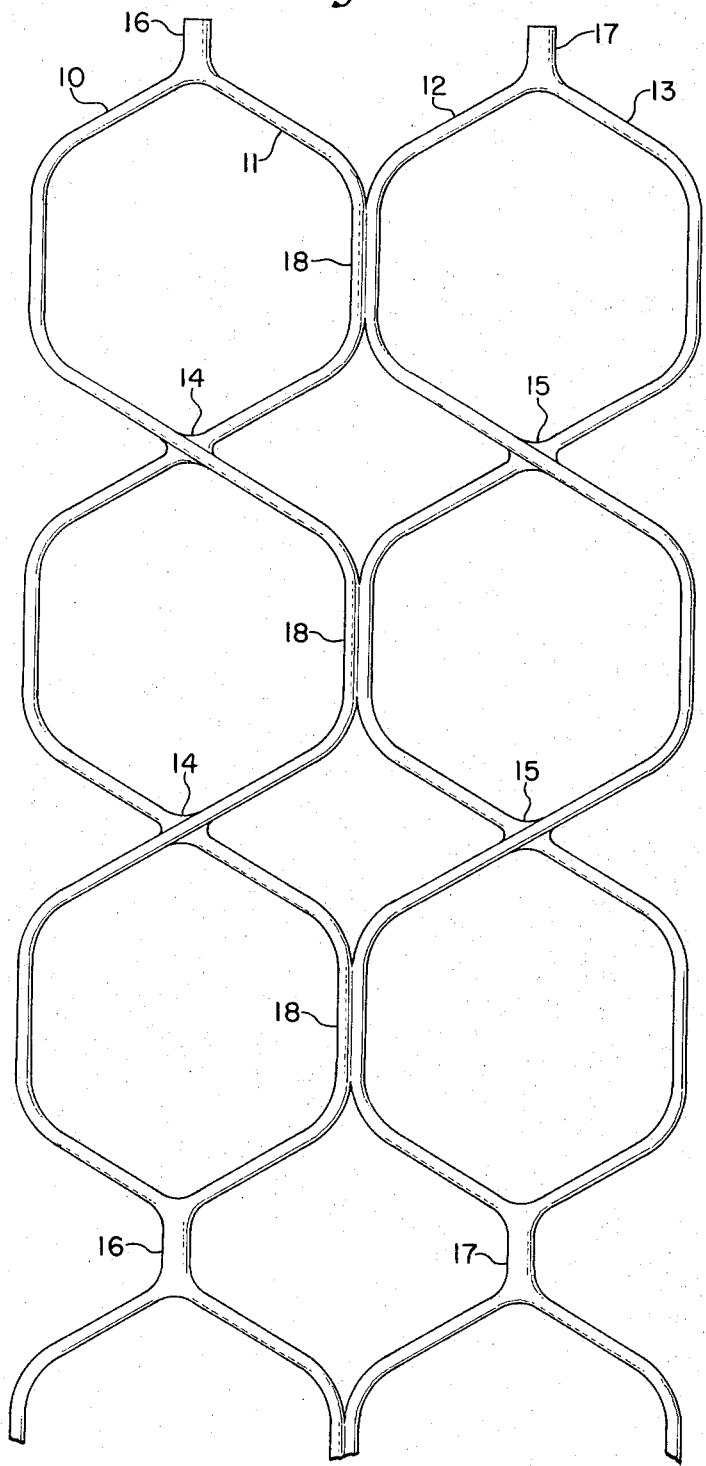
FIG. 1 is a top plan view of a section of extruded container carrier stock made according to the invention.

In FIG. 1 of the drawings, a section of container carrier stock made according to the invention is shown in plan view. Four plastic strands 10, 11, 12 and 13 are simultaneously extruded, and while in a molten or semi-molten state are caused to intersect and to be brought into side-by-side contact in a repeating pattern to produce the carrier stock. As is apparent in FIG. 1, the nozzles which extrude the strands 10 and 12 are positioned in a spaced apart relationship and are caused to reciprocate substantially together along lines perpendicular to the direction of extrusion of the strands. Strands 11 and 13 issue from extrusion nozzles which are also positioned in a spaced apart relationship and which move together in the same pattern which is generally oppositely from the pattern traced by the extrusion nozzles for the strands 10 and 12. As may be seen in FIG. 1, the strands 10 and 12 are directed over the strands 11 and 13 to form the intersections 14 and 15.

The embodiment of FIG. 1 is shown as a carrier stock for individual carriers for six containers, but it is to be understood that the extrusion nozzles may be moved to produce carrier stock of individual carriers for other numbers of containers. The end of each carrier in the stock is formed by having the extrusion nozzles cooperate to cause a side-by-side fusion of the strands in two groups, one group of strands 10 and 11 and the other group of strands 12 and 13 to form the joints 16 and 17. FIG. 1 at the intersections 14 and 15 and at the joints 16 and 17 shows the smooth curvilinear surfaces of those intersections and joints without sharp corners or notches. The joints 16 and 17 have a length sufficient to permit a transverse cutting of the joints 16 and 17 to separate an individual carrier from the stock.

The carrier stock of FIG. 1 further includes joints 18 which are formed by a side-by-side fusion of strands 11 and 12. The six container encircling bands formed by the four extruded and fused strands 10, 11, 12 and 13 are stretched and applied about a group of six containers such as cans to form a unitary package which is conveniently stored and transported.

In FIG. 2 the container stock of FIG. 1 is shown as passed between a pair of rollers, the top roller of which is shown at 20. If necessary the rollers 20 may be heated. The rollers 20 will flatten the strands 10, 11, 12 and 13, and the intersections thereof to produce the carrier stock configuration shown in FIG. 2 wherein the strand 10 becomes ribbon 10a, the strand 11 becomes ribbon 11a, the strand 12 becomes ribbon 12a, the strand 13 becomes ribbon 13a, the joints 14 become the web portions 14a, the joints 15 become the web portions 15a, the joints 16 and 17 respectively become the web portions 16a and 17a, and the joints 18 become the web portions 18a. The flattened carrier stock of FIG. 2 may be severed transversely through web portions 16a and 17a to form individual carriers for a group of containers such as six cans. When the container encircling bands thereof are stretched and applied about the circumferential surface of the cans, the container encircling bands will assume a substantially frustoconical shape with the inner periphery of the container encircling bands immediately below the chimes of the cans and above the outer periphery of the carrier. That frustoconical shape is substantially shown in the previously noted Poupitch U.S. Pat. No. 2,874,835.

FIG. 3 shows another embodiment of the invention and primarily differs from the embodiments of FIGS. 1 and 2 in the contemporaneous extrusion of a central handle member 30. Similarly to the above described embodiments, four plastic strands 31, 32, 33 and 34 are extruded from four nozzles which are reciprocated along lines perpendicular to the direction of extrusion of the plastic to cause appropriate fused intersections and side-by-side fusing with the straight line extruded handle member 30 to form a plurality of pairs of transversely positioned and longitudinally extending pairs of container encircling bands. The fused intersections of the strands 31 and 32 form joints 35. The fused intersections of the strands 33 and 34 form the joints 36. The elongated side-by-side fusing between the strands 31 and 32, and 33 and 34 form the severable joints between individual carriers of the stock as shown at 37.

The fused joints 38 between the container encircling bands of each pair with the handle member 30 complete the arrangement of the carrier stock as shown in FIG. 3. The container encircling bands of FIG. 3 are substantially elongated in the direction of extrusion so that when the container encircling bands are applied about the outer surface of containers such as cans 39 in FIG. 5, a shortening of the distance between adjacent joints 38 occurs which causes the handle portion 30 to fold upwardly into a convenient finger loop for carrying the package. The particular finger loop 30a of FIG. 5 result from a flattening of the central portion of the carrier stock as shown in FIG. 4.

Figure 5:
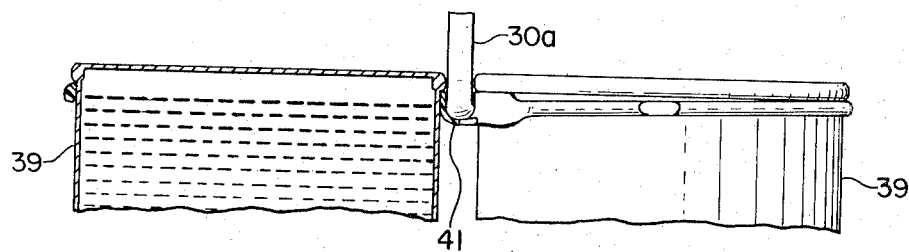
FIG. 5 is an elevational view, partially in cross section, showing a portion of the carrier stock of FIG. 4 as applied to a pair of containers.

FIG. 4 shows the carrier stock of FIG. 3 passing through a pair of rollers, the upper one of which is shown at 40. The rollers 40 are relatively narrow and span the central portion of the carrier stock to flatten portions of the strands 31, 32, 33 and 34 into flattened portions 31a, 32a, 33a and 34a respectively. The web portions 41 are a combination of portions of two groups of strands, with one group comprising strands 30, 32 and 33 and the other group comprising strands 30, 31 and 34. When the container encircling apertures are stretched and circumferentially applied to containers such as containers 39, the central web portions 41 will assume a somewhat U-shaped configuration such as shown in FIG. 5 and the handle means or finger loops 30a will project upwardly for convenient carrying of a unitary package of the carrier and a plurality of containers. A feature of the carrier construction of FIG. 4 is the substantial container surface engaging and gripping area resulting from the formation of the webs 41. That surface gripping arrangement produced by the webs 41 is greater than the surface contact produced by the unflattened portions of the container encircling bands, and is concentrated in the region of the package where vertical separating forces between the containers and the carrier are at a maximum when the package is transported by the finger loops 30a.

Figure 6:
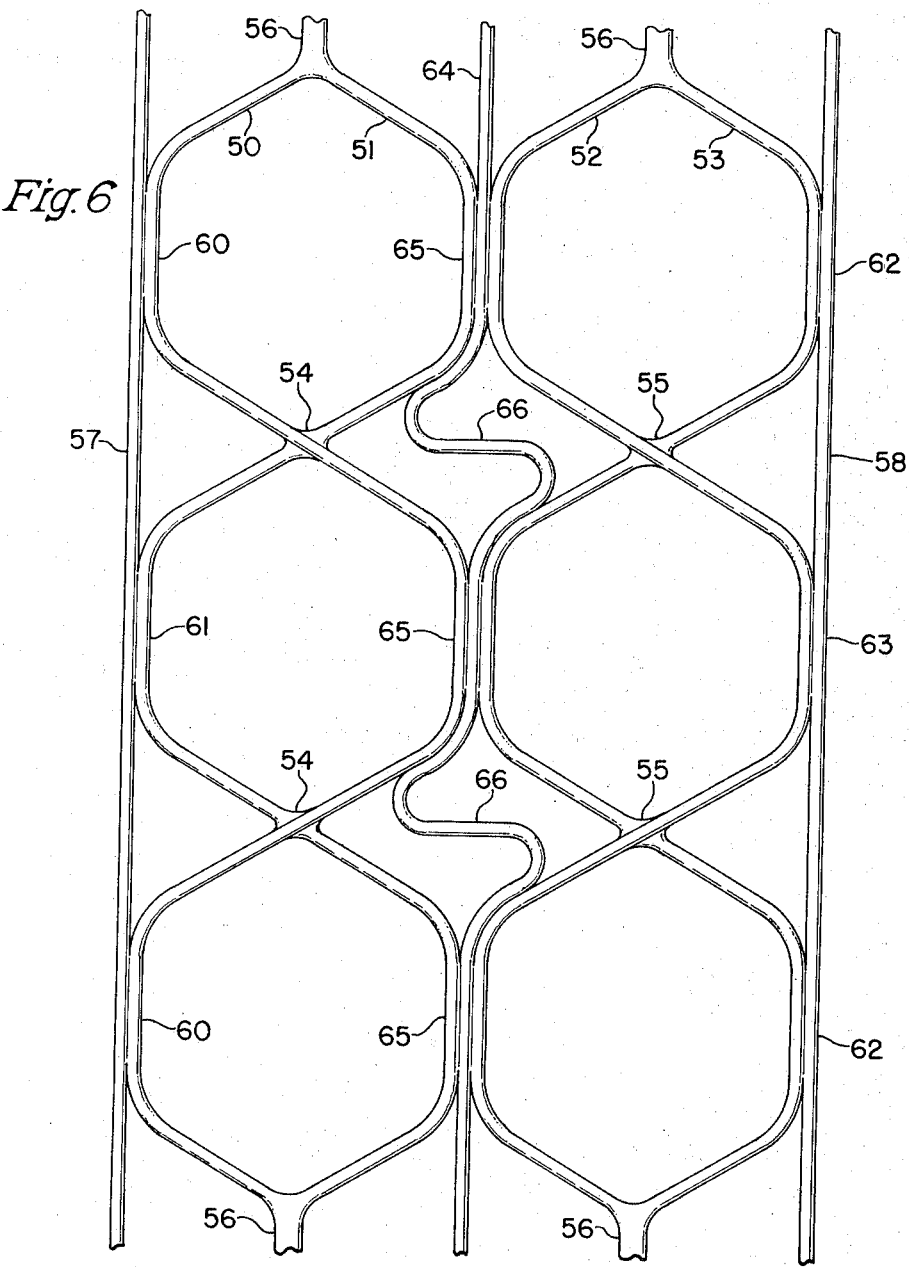
FIG. 6 is a top plan view of another embodiment of the invention.

FIG. 6 shows a further embodiment of the invention in plan view and comprises four strands 50, 51, 52 and 53 which are simultaneously extruded and moved in appropriate patterns to form intersections and consequent fused joints 54 and 55, and to form side-by-side fused joints 56 at the ends of the individual carriers in the carrier stock.

Two additional stationary extrusion nozzles are provided for extruding the strands 57 and 58. Strand 57 is directed into fusing engagement with the outer marginal edge of strands 50 and 51 to respectively form joints 60 and 61. Strand 58 is extruded to meet and fuse with the outer marginal edges of the container encircling bands formed by the strands 52 and 53 to respectively form the joints 62 and 63.

The carrier stock of FIG. 6 further includes strand 64. Strand 64 is formed by a seventh extrusion nozzle which is periodically alternatively stationary and reciprocating. The nozzle which extrudes strand 64 is caused to remain stationary when the nozzles for strands 50, 51, 52 and 53 are forming joints 60 and 62 on the one side of joints 56 and continues to remain stationary through the formation of the joints 56 and through the formation of the next joints 60, 62, or 61, 63. The nozzle forming the strand 64 is caused to reciprocate, and this reciprocation need not be in the plane of the nozzles forming the other strands, between the ending of one pair of joints 60, 61, through the formation of the joints 54 and 55, and to the beginning of the next joints 61, 63. When the nozzle forming the strand 64 is stationary the web portions 65 are formed between the container encircling bands of each pair of container encircling bands. When the nozzle forming strand 64 is caused to reciprocate the finger loops 66 are formed between adjacent web portions 65.

By virtue of the described arrangement of the carrier stock shown in FIG. 6, a minimum of shortening or change in pitch occurs when the container encircling bands are stretched and applied about the surface of the containers intended to be associated therewith, and the strands 57 and 58 will form taut side rails for the unitary package of the carrier and the containers retained thereby. The finger loops 66 have a length sufficient to permit a person's finger to easily slip thereunder for convenient carrying of the package.

It should be noted that when the individual carriers are severed from the carrier stock of FIG. 6 the strands 57, 64 and 58 must be cut in addition to transverse severing of the joints 56. If desired, the strands 57, 64 and 58 may each be cut at two positions close to the container encircling apertures to avoid excessive projections of the severed strands 57, 64 and 58 from the end of an individual carrier.

It should further be noted that he invention contemplates that the strands 57, 64 and 58 may be extruded to have selectively greater or lesser thickness than the thickness of the strands 50, 51, 52 and 53.

Having described the invention, it is to be understood that changes can be made in the described embodiments by one skilled in the art within the spirit and scope of the invention as defined in the claims.

I claim:

1. A multiple container carrier for a plurality of containers, comprising a plurality of plastic strands formed from a resilient deformable plastic material, said strands having fusion joints at certain positions longitudinally thereof to define a plurality of integral bands, said fusion joints being shaped as smooth curvilinear surfaces void of any sharp corners whereby said bands are stretchable for individually circumferentially encircling and gripping one of said containers substantially void of any notching at said joints, said bands arranged to form a plurality of pairs of oppositely arranged container encircling bands, and a pair of side rails integrally interconnected by fusion joints to the opposite outer edge portions of said container encircling bands.

2. A multiple container carrier as defined in claim 1, and a handle member integrally interconnected by fusion joints to said strands to extend longitudinally of the carrier between the bands of each pair of bands.

3. A multiple container carrier as defined in claim 2, and said handle member and the portions of said strands connected thereto being flattened to have substantially less thickness and greater width than the remaining portions of said bands.

4. A carrier package comprising a plurality of generally cylindrical containers, and a container carrier for said containers, said container carrier comprising a plurality of plastic strands formed from a resilient deformable plastic material, said strands having fusion joints at certain positions longitudinally therof to define a plurality of integral bands, said fusion joints being shaped as smooth curvilinear surfaces void of any sharp corners, the inner periphery of said bands being less than the outer circumference of said containers, said container encircling bands being stretched and applied circumferentially of said containers to resiliently grip said containers substantially void of any notching tendency at said joints and to form a unitary package of said carrier and said containers, and said carrier having handle means for transporting said package, said handle means comprising a strand integrally interconnected by fusion joints between said container encircling bands, the portion of said strand defining said handle means having a length substantially greater than the center-to-center distance between corresponding containers in said package, and an additional pair of strands integrally interconnected by fusion joints to the longitudinal outer periphery of said carrier, said additional pair of strands having a length so that said additional pair of strands are taut.

* * * * *